(12) United States Patent
Gallery et al.

(10) Patent No.: US 6,169,545 B1
(45) Date of Patent: Jan. 2, 2001

(54) DATA MANAGEMENT WITHIN A VIRTUAL ENVIRONMENT BROWSER

(75) Inventors: Richard D. Gallery, Dublin (IE); Dale R. Heron, Ashtead; Michael K. Verhagen, Horley, both of (GB)

(73) Assignee: U.S. Philips Corporation, New York, NY (US)

(*) Notice: Under 35 U.S.C. 154(b), the term of this patent shall be extended for 0 days.

(21) Appl. No.: 09/170,465

(22) Filed: Oct. 13, 1998

(30) Foreign Application Priority Data

Oct. 14, 1997 (GB) .................................................. 9721664

(51) Int. Cl.[7] .................................................. G06F 3/00
(52) U.S. Cl. .................................................. 345/333
(58) Field of Search .................................. 345/333, 335, 345/326, 329, 357, 430; 709/203, 209, 213, 214, 215, 217, 219

(56) References Cited

U.S. PATENT DOCUMENTS 5,956,038  *  9/1999  Rekimoto .............................. 345/419
6,020,885  *  2/2000  Honda .................................. 345/332

FOREIGN PATENT DOCUMENTS

| 0697613A2 | 2/1996 | (EP) . |
| 0753835A2 | 1/1997 | (EP) . |
| 0753836A2 | 1/1997 | (EP) . |
| 0899924A2 | 3/1999 | (EP) . |

OTHER PUBLICATIONS

"Building VRML Worlds" by E. Tittel et al, McGraw Hill 1997, pp. 26–31.

* cited by examiner

Primary Examiner—Crescelle N. dela Torre
(74) Attorney, Agent, or Firm—Gregory L. Thorne

(57) ABSTRACT

A data browser is described for accessing data defining virtual environments via the Internet/World Wide Web. In conjunction with at least one store (44) of virtual environment assets, such as audio, video, graphics textures and so forth, a list (62) is maintained recording the identity of the stored assets received via the Web, suitably in the form of their respective URL's. Browser applications requiring assets from the store (44) scan the master list to determine whether a particular asset is already stored there on encountering a program requirement for that asset to avoid the need to access the remote source of asset data via the Web. Where the assets are distributed over more than one storage device (44, 60), each device is suitably provided with such a contents list.

9 Claims, 2 Drawing Sheets

DATA MANAGEMENT WITHIN A VIRTUAL ENVIRONMENT BROWSER

Figure 1:
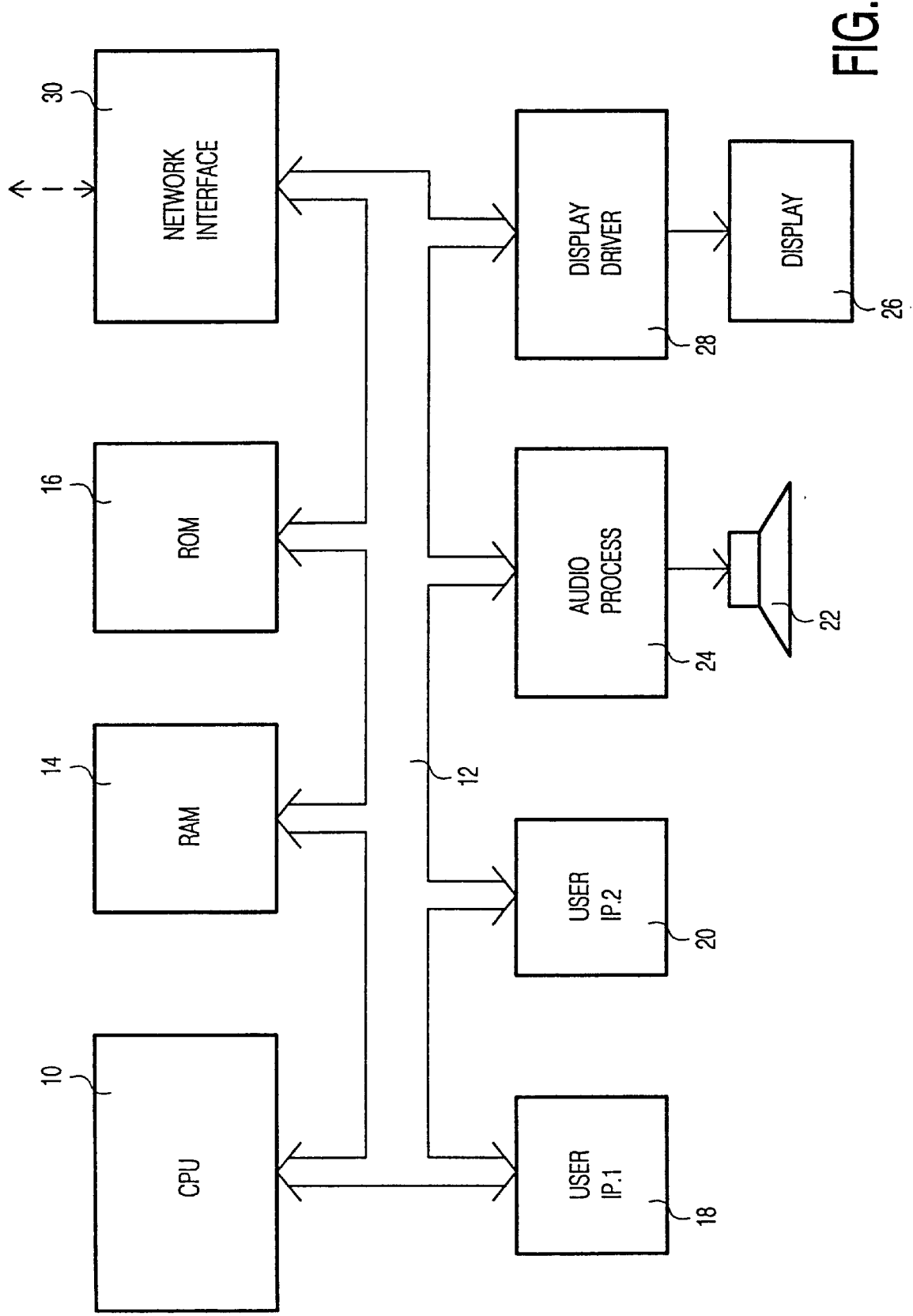

The present invention relates to apparatus for accessing, from a remote source, data defining a graphical representation of a virtual environment, with the user being enabled to select a viewpoint within the virtual environment and having means for rendering a display of the virtual environment from that viewpoint.

A description of a service providing a virtual environment (or cyber-space) accessible by remote users is given in European patent application EP-A-0 697 613 (Sony Corp.). The system described includes a server providing a virtual reality space, and user terminals connected to the server via a high-speed communications network (using optical fibres or the like). In operation, the server maintains a number of virtual environments and supports many differing terminal types by the use of conversion objects between information objects and user objects: the conversion objects provide individually tailored translation for communications back and forth between each type of terminal and each configuration of virtual environment supported.

A particular benefit arises when the format of data storage and representation for virtual environments is at least partially standardised, allowing for greater interchange between systems of different manufacturers as well as a reduction in the necessity for individually tailored translation utilities. With at least partial standardisation, the necessary configuration of a browser for accessing such data, whether in hardware or software implementation or a mixture of the two, becomes simpler.

A notable example of standardisation in the field of data defining virtual environments is the so-called Virtual Reality Modelling Language (VRML) as described, for example, in the VRML standard, version 2.0, issued as ISO/IEC WD14772 on Aug. 4, 1996. VRML is a file format for describing interactive three-dimensional objects and worlds to be experienced on the Internet/World Wide Web and it is generally analogous to the way HTML (HyperText Markup Language) is used to describe documents for transmission over the Internet. A number of examples of VRML browsers are discussed in "Building VRML Worlds" by E. Tittel et al, published by McGraw Hill 1997, ISBN 0-07-882233-5, at pages 26 to 31. The functionalities of the different browsers, over and above the basic required for conformity, depend to a large extent on their target host system and the likely uses of the same, as well as whether they are purpose-built/written or whether they are modifications of earlier utilities.

In order to simplify the specification of how objects appear within a virtual environment, it is a known technique to restrict such objects to constructions from indexed face sets of geometrical data including a limited set of "building blocks" such as spheres, cylinders, cones and boxes, which may be simply specified in relatively few parameters. Onto these components, graphic textures may be mapped. These textures form one of a number of assets for the virtual environment (others include audio and video segments, and scripting code segments) which may be used once or several times within a single generated view of the environment. In order to allow a browser implementation to operate with the minimum amount of run-time data required to simulate (including rendering both graphically and audibly) the complete virtual world, the technique of instancing may be used, with one or more of the assets requiring to be defined on just its first appearance within a view; subsequent appearances within the same view make use of the definition in the previous instance.

Whilst this technique saves storage by avoiding repeatedly defining features, the applicants have recognised that further and greater savings may be made by extending the broad concept of instancing to further operational functions of an environment browser.

It is an object of the present invention to provide a user operable means for browsing data defining a virtual environment and rendering a view of the same, having improved efficiency in the handling of data assets associated with the generation and functions of said virtual environment.

In accordance with the present invention there is provided a data processing apparatus configured as a virtual environment data browser, the apparatus comprising a processor coupled with at least one memory device and data network interface means capable of receiving data defining a virtual environment and objects therein when coupled to a data network including a source of such data, the apparatus further comprising user input means and being configured to periodically generate an image based on said data defining the virtual environment and objects and from a viewpoint at a location and with an orientation in said virtual environment determined at least partially by input from said user input means; characterised in that the apparatus is arranged to maintain a record in the form of a master list in the memory identifying data assets received via said network and stored in the memory, to scan the master list to determine whether a particular asset is already stored on encountering a subsequent apparatus requirement for that asset and, if not, to formulate and send to the remote source of data via the data network a request for supply of said asset.

Where the network is the World Wide Web, assets obtained from data sources coupled thereto may suitably be identified in the master list by their respective Uniform Resource Locators. Where two or more types of asset are identified and stored in the memory, the master list is preferably subdivided into respective sections for each asset type. Although some additional memory is required for the maintenance of the master list, this will generally be more than offset by the reduction to one in the number of copies of various assets stored, together with the avoidance of unnecessary calls via the Web to obtain assets that the browser already holds.

A further memory device may be incorporated within the browser, with the apparatus being configured to identify and store therein a predetermined type of asset from amongst those received. This further memory device, where provided, may suitably contain a local master list for the assets stored therein, and the apparatus is suitably arranged to update the master list and local master list as assets are added to, or deleted from, the memory or the further memory device. The further memory device may be a small fast-access device, for example holding data defining graphics textures.

Figure 2:
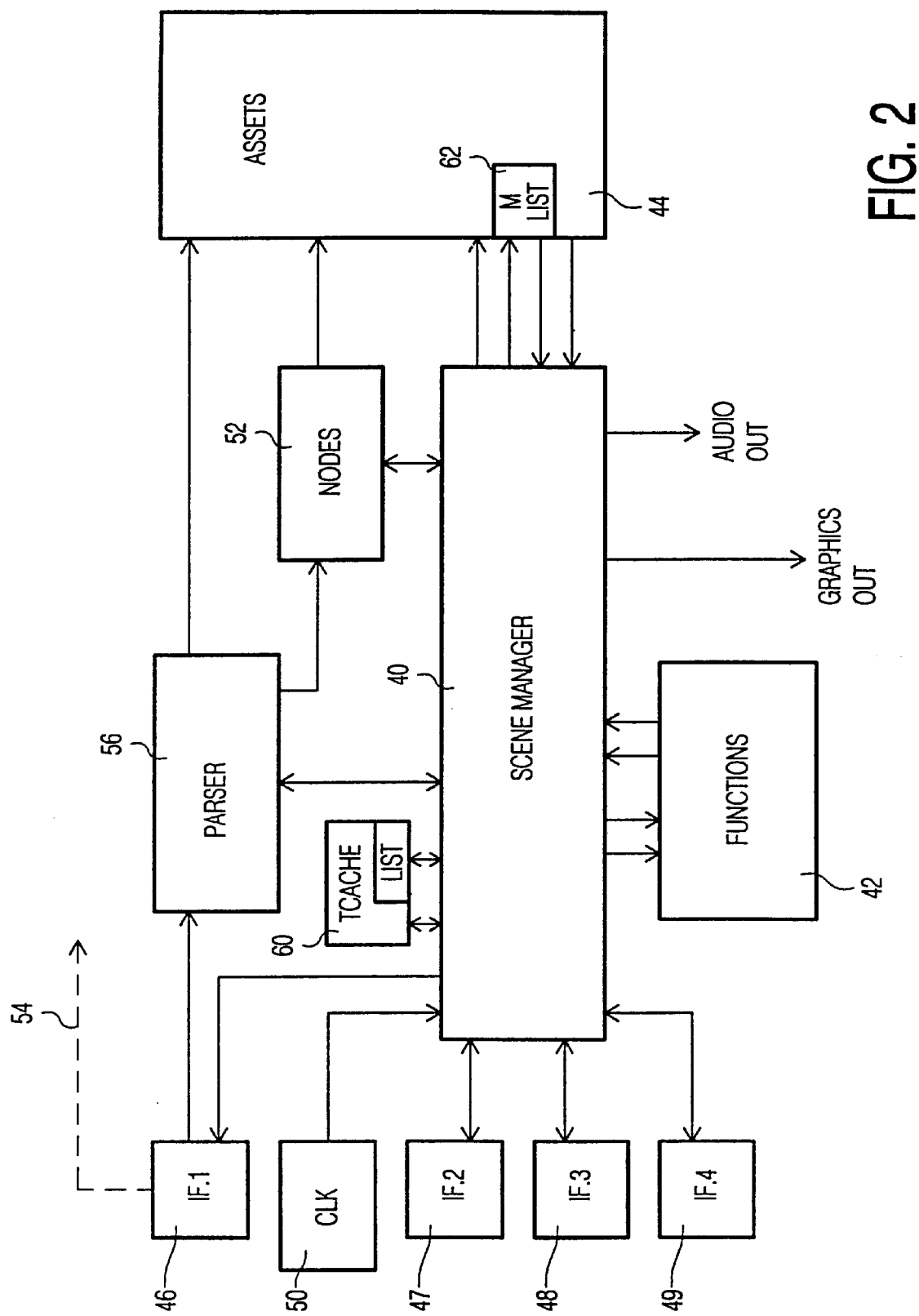

The invention will now be described by way of example only, with reference to the accompanying drawings, in which:

FIG. 1 is a block schematic diagram of a data processing system suitable to embody the present invention; and FIG. 2 represents the component functions of a browser, as hosted by the system of FIG. 1, and embodying the invention.

FIG. 1 represents a data processing system, such as a personal computer, which acts as host for a software utility that configures the system as a browser for data defining a virtual environment. The system comprises a central processing unit (CPU) 10 coupled via an address and data bus 12 to random-access (RAM) and read-only (ROM) memory devices 14, 16. The capacity of these memory devices may be augmented by providing the system with means to read from additional memory devices, such as a CD-ROM.

Also coupled to the CPU 10 via bus 12 are first and second user input devices 18, 20 which may suitably comprise a keyboard and a cursor control and selection device such as a mouse or trackball. Audio output from the system is via one or more speakers 22 driven by an audio processing stage 24; in addition to providing amplification, the audio processing stage is preferably also configured to provide a signal processing capability under the control of the CPU 10 to allow the addition of sound treatments such as echo to existing audio data. Video output from the system is presented on display screen 26 driven by display driver stage 28 under control of the CPU 10.

A further source of data for the system is via online link to remote sites, for example via the Internet, to which end the system is provided with a network interface 30 coupled to the bus 12. The precise construction of the interface is not an essential feature of the present invention, although it will be recognised that the interface configuration will depend on the type of data network to which the system is to be coupled: for example, where the system is for use by a private home user, the data link is likely to be a telephone connection to a local service provider. In such a case, the interface 30 will suitably incorporate a modem. For other types of data link, such as an ISDN connection, the interface will be configured accordingly.

Turning now to FIG. 2, the inter-relationship of a number of functions assembled to configure the hardware of FIG. 1 as a browser is illustrated. The functions in the example illustrated are particularly suited for browsing virtual environments defined in accordance with the VRML standard, version 2.0, issued as ISO/IEC WD14772 on Aug. 4, 1996, although it will be understood that the present invention is not restricted by, or limited to, conformance with this standard. Only those components and functions of the browser as are required for understanding of the present invention will be described in detail: a fuller description of this browser configuration and its operation is given in the commonly assigned United Kingdom patent application 971101.9, filed May 29, 1997 and unpublished at the priority date of the present application.

The browser is based around a scene manager 40 coupled with respective stores for functions 42, assets 44, and a hierarchy of scene nodes 52. In terms of the hardware of FIG. 1, the function, asset and hierarchy stores will generally be held in RAM 14, although some of the assets (for example standardised texture maps) may be provided in fast local caches, as represented at 60 in FIG. 2, or via offline storage such as CD-ROM. The browser implementation program is suitably held in ROM 16, optionally linked to the boot-up utility of the system. Also coupled with the scene manager are four interfaces (IF.1–IF.4) 46–49 and a clock 50. The first of the four interfaces 46 corresponds in part to interface 30 of FIG. 1 in that it represents the source of data received via the Internet: as represented by dashed line 54, the received data may be passed on from the interface to other (not shown) destinations, such as a further browser for HTML content in the received data. The first interface is the general arrival point for the data defining the virtual environment and, as such, it may also receive data from more local sources such as storage on the system RAM (14; FIG. 1) or a CD-ROM.

From the first interface, the data passes to a parsing stage 56 which divides it into data defining or relating to assets (which data is then passed to store 44) and data defining or relating to the run-time node hierarchy (which data is then passed to store 52). In operation, it will generally be the case that only the data required (in terms of texture, co-ordinates etc) immediately or in the short term will actually be loaded up by the browser. Related information not immediately required is instead held in the form of an address for its current storage location: in the case of data to be called up via the Internet, the data held by the browser will suitably be a URL (uniform resource locator) so that the browser can simply call up the data, via the first interface IF.1, when the need for it becomes imminent—for instance when the user starts moving their virtual world viewpoint towards an object to be rendered using a texture not currently stored in the browser. Note that, as will be described, certain classes of data are not suited for such "off-site" storage.

The second interface 47 is an external API (application programming interface) which may comprise a set of interfacing subroutines such as to enable multiple-user extensions to the system, for example in support of two or more users having respective viewpoints within a common environment.

The third interface 48 is similar to the second and is for operational segments used to program behaviour in a scene: these segments are referred to in VRML as script nodes. The script nodes contain a program module which, in response to a change or user action within a scene, effect a change somewhere else in the scene depending on the contents of the program module. The program modules may suitably contain Java® language segments (Java is the object-oriented platform-independent and general-purpose programming environment developed by Sun Microsystems Inc). The third interface 48 (and also the second 47 where this is based on Java) provides a path to a Java interpreter which converts the Java segments from their platform-independent form to a form recognised by the host system.

The fourth interface 49 handles the passing of signals from (and in some instances to) the user input devices.

The functions (functional modules) held in store 42 include an audio manager, MPEG decoder, features for node run-time implementations (such as interpolators), collision detectors, three-dimensional pickers, viewpoint control and routing mechanisms.

The assets within store 44 are the basic building blocks and operational features from which the virtual environment is built up. These include:

Three-dimensional geometry: defining the configuration and relative location of the polygons to be assembled for the virtual environment. It should be noted that each node (or screen component) will generally be defined in terms of its own co-ordinate system, which co-ordinates are converted by matrix multiplication back through a hierarchy to convert all components to a common set of "world" co-ordinates.

Textures: surface detail (at variable levels of resolution where storage space permits) for mapping onto polygon surfaces during rendering.

Audio data: audio segments, sound effects etc. to accompany particular scenes or events within the virtual environment.

Java® code: the segments of code within script nodes and external authoring interface (EAI) code that are called to handle various processes or actions within the rendered scene.

User interaction data: for example, viewpoint control modes, identification of different user input devices and so forth.

MPEG data; video image data with accompanying data identifying compression, stored motion vectors etc.

Animation data.

As shown, within asset store 44 is a master list 62 which identifies the assets (or their URL's) within the store. With this feature, whenever an identifier such as a URL for an asset is encountered in a VRML file, a quick check of the identifiers listed in master list 62 will indicate whether or not it is necessary to call for the asset from a remote location. Where the assets are spread over separate storage devices, the grouping is suitably coincident with the asset types. Also, for each such further store, a local list of asset identifiers is provided, as shown for the texture cache 60.

As previously mentioned, storage of a URL in place of a block of data is not applicable in some circumstances. In VRML, only the following file and/or data types may be held as URL's: HTML files, textures, sounds, MPEG sequences and whole VRML files packaged as "Inline" file nodes. These may be stored off-site since for each it is possible to make a positive determination that the data is not currently required, and hence may be fetched when it is determined that use is imminent. On the other hand, script nodes and segments of EAI code may have an effect on the scene currently viewed by the user, even if the objects to which they relate are not currently in vision, and hence they must always be loaded. Animation and three-dimensional geometry data is generally also required to be loaded for reasons of effect on the scene in view, although off-site storage is permissible where the data relates to separate and individual entities which may be packaged as an Inline file.

The further store for run-time structures 52 contains the VRML scene graph together with routes to allow dynamic behaviour. The scene graph is a hierarchical file specifying the connections between the various geometrical components making up an object within the virtual environment.

Whilst the procedure implemented in the browser to determine whether or not it is necessary to access remote locations to obtain assets may be considered as a sort of system-level instancing, although the term "instancing" is used not in the strict object-oriented sense of the word, but in the sense of copying an object in such a way that if the definition of the object is changed on the fly (possible with VRML routing) all the copied objects change in the same way. As an example, if a texture of a brick wall were required on more than one wall in a virtual world, the texture would only be stored once and "instanced" for the other occurrences. If this original texture were changed in any way (e.g. altering the mapping) then all instances of the texture would be changed.

This use of instancing within the constraints of a VRML file, and on a broader level to avoid unnecessary effort in accessing data results in an efficient browser core wherein for each data type the browser implementation can maintain a list of unique assets and then instances can be realised by simply accessing entries in this list.

Although defined principally in terms of a software browser implementation, the skilled reader will be well aware than many of the above-described functional features could equally well be implemented in hardware.

From reading the present disclosure, other modifications will be apparent to persons skilled in the art. Such modifications may involve other features which are already known in the design, manufacture and use of image processing and/or data network access apparatus and devices and component parts thereof and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. Data processing apparatus configured as a virtual environment data browser, the apparatus comprising a processor coupled with a least one memory device and data network interface means capable of receiving data defining a virtual environment and objects therein when coupled to a data network including a source of such data, the apparatus further comprising user input means and being configured to periodically generate an image based on said data defining the virtual environment and objects and from a viewpoint at a location and with an orientation in said virtual environment determined at least partially by input from said user input means; characterized in that the apparatus is arranged to maintain a record in the form of a master list in the memory identifying two or more different types of data assets received via said network and stored in the memory wherein the master list is subdivided into respective sections for each asset type, to scan the master list to determine whether a particular asset is already stored on encountering a subsequent apparatus requirement for that asset and, if not, to formulate and send to the remote source of data via the data network a request for supply of said asset.

2. Apparatus as claimed in claim 1, wherein the network is the World Wide Web and assets obtained from data sources coupled thereto are identified in the master list by their respective Uniform Resource Locators.

3. Apparatus as claimed in claim 1, comprising a further memory device with the apparatus being configured to identify and store therein a predetermined type of asset from amongst those received.

4. Apparatus as claimed in claim 3, wherein said further memory device contains a local master list for the assets stored in said device, the apparatus being arranged to update the master list and local master list as assets are added to, or deleted from, the memory or the further memory device.

5. Apparatus as claimed in claim 3, wherein said further memory device holds data defining graphics textures.

6. Apparatus as claimed in claim 2, comprising a further memory device with the apparatus being configured to identify and store therein a predetermined type of asset from amongst those received.

7. Apparatus as claimed in claim 6, wherein said further memory device contains a local master list for the assets stored in said device, the apparatus being arranged to update the master list and local master list as assets are added to, or deleted from, the memory or the further memory device.

8. Apparatus as claimed in claim 7, wherein said further memory device holds data defining graphics textures.

9. A data processing apparatus configured as a virtual environment data browser, comprising:

a processor coupled with a data network interface means capable or receiving data defining a virtual environment and objects therein when coupled to a data network including a source of such data; and user input means configured to periodically generate an image based on said data defining the virtual environment and objects and from a viewpoint at a location and with an orientation in said virtual environment determined at least partially by input from said user input means; and a memory device in data communication with the processor, the memory device being arranged in sections wherein a particular data asset type is stored in a corresponding section, all of the sections forming a master list of all data assets types received via said network;

said processor being configured to scan the master list to determine whether a particular data asset is already stored on encountering a subsequent apparatus requirement for that data asset and, if not, to formulate and send to the remote source of data via the data network a request for supply of said particular data asset.

* * * * *